US012803449B2

(12) United States Patent
Wang et al.

(10) Patent No.: US 12,803,449 B2
(45) Date of Patent: Nov. 17, 2026

(54) NON-ISOLATED FULL BRIDGE DC-DC CONVERTER WITH OUTPUT FILTER

(71) Applicant: Bel Fuse (Macao Commercial Offshore) Limited, Macao (MO)

(72) Inventors: Jifei Wang, Hangzhou (CN); Hongliang Lu, Hangzhou (CN)

(73) Assignee: Bel Fuse (Macao Commercial Offshore) Limited (MO)

( * ) Notice: Subject to any disclaimer, the term of this patent is extended or adjusted under 35 U.S.C. 154(b) by 153 days.

(21) Appl. No.: 18/805,758

(22) Filed: Aug. 15, 2024

(65) Prior Publication Data

US 2026/0051823 A1 Feb. 19, 2026

(51) Int. Cl.
*H02M 3/335* (2006.01)

(52) U.S. Cl.
CPC ................................ *H02M 3/33569* (2013.01)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153;

(Continued)

(56) References Cited

U.S. PATENT DOCUMENTS

| | | | | |
|---|---|---|---|---|
| 12,395,087 B1 | 8/2025 | Vinciarelli et al. | | |
| 2015/0092451 A1* | 4/2015 | Popovici | ................ | H02M 3/28 363/17 |

(Continued)

FOREIGN PATENT DOCUMENTS

| | | |
|---|---|---|
| EP | 3972106 A1 | 3/2022 |

OTHER PUBLICATIONS

Analog Devices, Power by Linear, "Synchronous Dual Mode Phase Modulated Full Bridge Controllers," LTC372-1/LTC3722-2, https://www.analog.com/media/en/technical-documentation/data-sheets/LTC3722-1-3722-2.pdf, March 7, 2013, pp. 1-28.

(Continued)

*Primary Examiner* — Nusrat Quddus
(74) *Attorney, Agent, or Firm* — BainwoodHuang

(57) ABSTRACT

A non-isolated converter includes a transformer having a primary winding and a secondary winding, a primary-side inverter, a secondary-side rectifier, and an output filter. The primary-side inverter is a full-bridge inverter providing two conduction paths for primary current during ON intervals of a switching cycle. The conduction paths are connected at a low-side common connection directly connected to the output side of the secondary winding, to provide the converter output current as the sum of the primary current and the secondary current during the ON intervals. Because the converter output includes a contribution from primary-side current due to the direct connection, certain advantages may be realized such as reduced primary-winding area/losses and reduced losses in the secondary-side rectifier.

4 Claims, 4 Drawing Sheets

(58) Field of Classification Search
CPC ........ H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/073; H02M 3/10; H02M 3/135; H02M 3/137; H02M 3/315; H02M 3/3155; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; Y02B 70/1491; H02J 3/46; H02J 3/38
See application file for complete search history.

(56) References Cited

U.S. PATENT DOCUMENTS

| | | | | |
|---|---|---|---|---|
| 2022/0094276 | A1 * | 3/2022 | Appelberg .......... | H02M 1/0064 |
| 2025/0015722 | A1 | 1/2025 | Ren et al. | |

OTHER PUBLICATIONS

Huang Daocheng; et al.; "Novel Non_Isloated LLC Resonant Converters," Applied Power Electronics Conference and Exposition (APEC), 2012 Twenty-Seventh Annual IEEE, Feb. 5, 2012, pp. 1373-1380.

Ren Xufu; et al.; "A Non-Isolated Fixed-Ratio DC-DC Converter Using Switched Auto-Transformer (SATx) for Data Center Applications". 2023 IEEE Energy Conversion Congress and Exposition, Conference Date Oct. 29, 2023-Nov. 2, 2023, pp. 3321-3324.

* cited by examiner

NON-ISOLATED FULL BRIDGE DC-DC CONVERTER WITH OUTPUT FILTER

BACKGROUND

The invention is related to the field of DC-DC switching converters.

SUMMARY

A disclosed non-isolated converter includes a transformer having a primary winding and a secondary winding, a primary-side inverter for switched conduction of primary current from a converter input through the primary winding, a secondary-side rectifier for switched conduction of secondary current through the secondary winding to a converter output, and an output filter connected to an output side of the secondary winding for filtering converter output current to reduce a switching-related AC component of converter output. The primary-side inverter is a full-bridge inverter providing two conduction paths for the primary current during respective ON intervals of a switching cycle, wherein the conduction paths are connected together at a low-side common connection directly connected to the output side of the secondary winding to provide the converter output current as the sum of the primary current and the secondary current during the ON intervals of the switching cycle. Because the converter output includes a contribution from primary-side current due to the direct connection, certain advantages may be realized such as reduced primary-winding area/losses and reduced losses in the secondary-side rectifier.

BRIEF DESCRIPTION OF THE DRAWINGS

The foregoing and other objects, features and advantages will be apparent from the following description of embodiments of the invention, as illustrated in the accompanying drawings in which like reference characters refer to the same parts throughout the different views.

DETAILED DESCRIPTION

Figure 1:
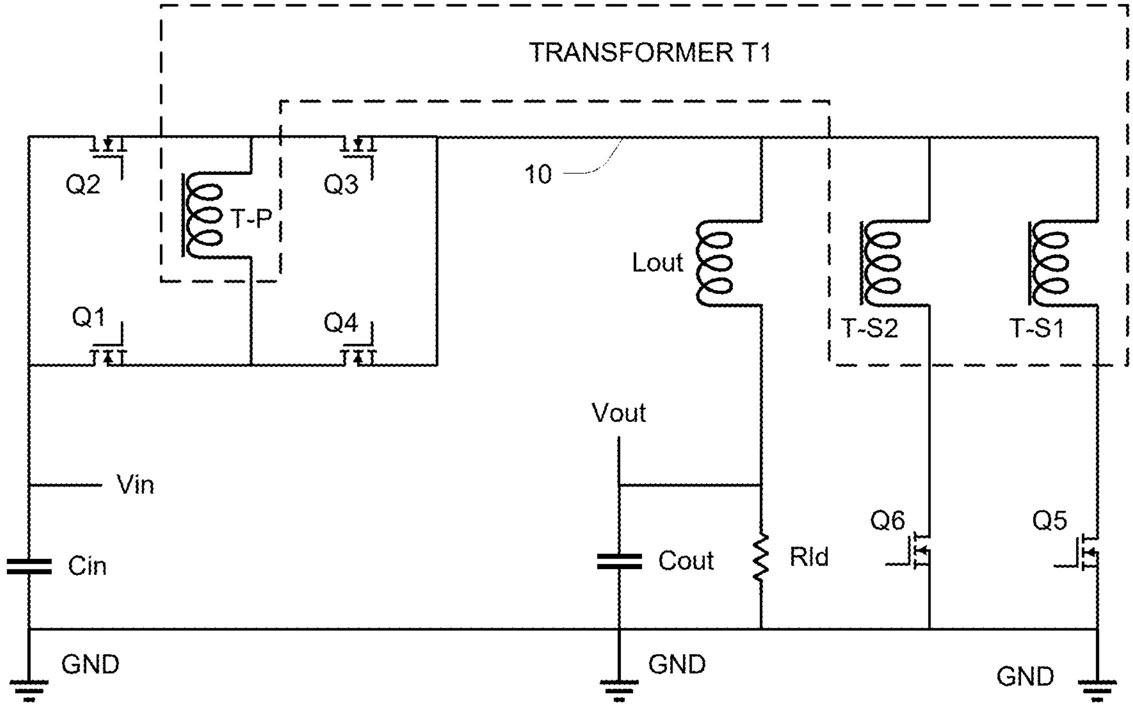
FIG. 1 is a schematic diagram of a non-isolated full bridge converter.

FIG. 1 shows a non-isolated full bridge converter that includes a transformer T1, primary-side switches Q1-Q4 in full bridge configuration, secondary-side switches Q5-Q6, and other components including capacitors Cin, Cout, inductor Lout, and a representation of load as a load resistor Rld. The transformer T1 has a primary winding T-P and two secondary windings T-S1, T-S2. Both the primary-side circuitry and secondary-side circuitry are connected to a single shared ground GND. This common ground connection between the primary-side circuitry and the secondary-side circuitry establishes the "non-isolated" aspect of the arrangement. It will be understood that the transistors Q1-Q6 have their gates connected to respective switching control signals from separate control circuitry which, although not explicitly shown, will be understood by those skilled in the art to have structure and function to realize operation as described fully below.

More specifically:

1. A primary bridge comprises Q1, Q2, Q3, Q4, where the drains of Q1 and Q4 are connected together and connected to Vin source; the source of Q1 is connected to the drain of Q4 and connected to one end of the primary winding T-P of transformer T1; the source of Q2 is connected to the drain of Q3 and connected to the other end of the primary winding T-P of transformer T1; and the sources of Q3 and Q4 are connected together;
2. The transformer T1 has primary winding T-P and secondary windings T-S1, T-S2, with the windings T-P, T-S1, and T-S2 being fully coupled to each other;
3. Output rectifier circuit includes Q5 and Q6, where Q5 is in series with T-S1, and Q6 is in series with Q6;
4. The source nodes of Q3 and Q4 are tied together and connected (via connection 10) to the output inductor Lout and the secondary center tap between T-S1 and T-S2;
5. The output filter includes the inductor Lout and capacitor Cout;
6. The number of turns of the primary winding T-P is Np, and the number of turns of the secondary windings T-S1 and T-S2 are equal and identified as Ns.

Regarding #4 above, this arrangement is also referred to herein as having the two primary-side conduction paths having a low-side common connection (Q3-Q4 connection point) that is directly connected to the output side of the secondary winding (center tap of T-S1, T-S2 in this embodiment).

Operation is described with reference to the annotated circuit diagrams of FIGS. 2-4 and the waveform diagram of FIG. 5. Referring to FIG. 5, overall operation is an ongoing series of switching cycles at regular intervals of duration T corresponding to a switching frequency, which may be in the range 10-100 kHz for example. Each cycle is divided into periods or intervals demarcated by times shown as t0, t1, t2, t3 and t4. For ease of reference herein, the periods t0-t1 and t2-t3 are referred to as ON intervals (of duration D), referring to conduction of primary-side current, and the periods t1-t2 and t3-t4 are referred to as OFF intervals (of duration T-D), referring to the non-conduction of primary-side current.

Figure 2:
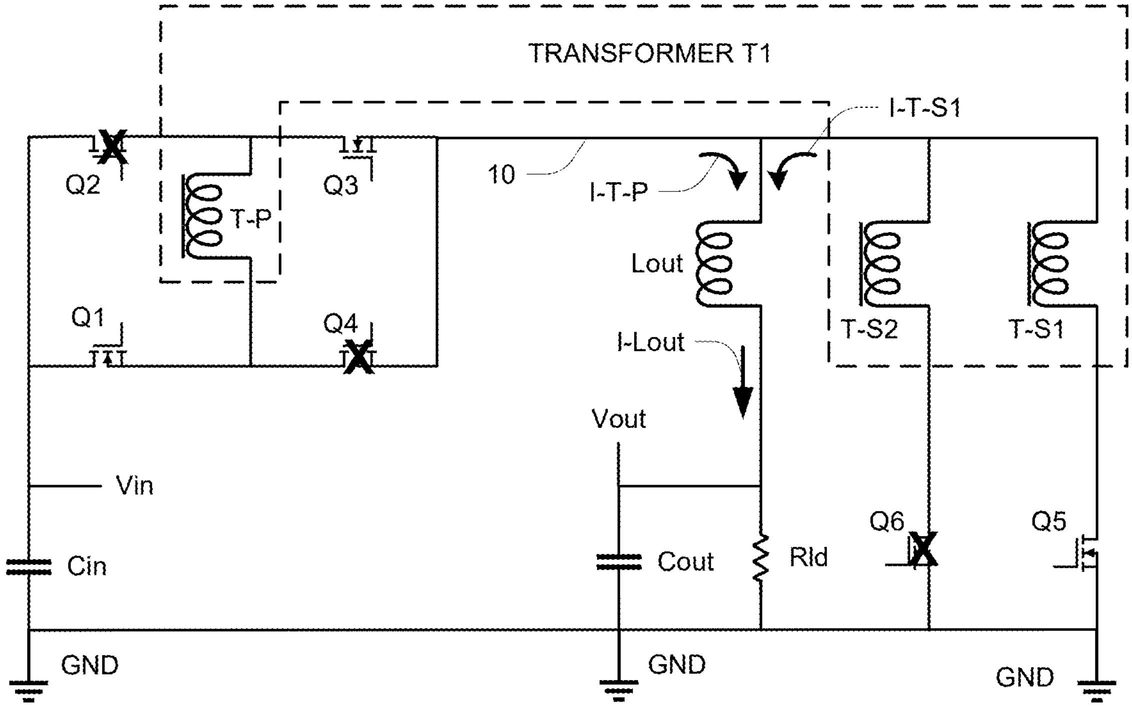
FIG. 2 is a schematic diagram of the non-isolated full bridge converter showing switch states and current conduction in a first ON interval of operation.

FIG. 2 shows operation in the first ON interval t0-t1. The switches Q1, Q3, and Q5 are turned on, and switches Q2, Q4, and Q6 are turned off (indicated by the large X on these components in FIG. 2). The voltage of Vin drops in the windings T-P and T-S1. The voltage drop on T-P is Vin*Np/(Np+Ns), and voltage drop on T-S1 is Vin*Ns/(Np+Ns). The primary-side current I-T-P is Ns*I-T-S1/Np, and the output current I-Lout is equal to the sum I-T-P+I-T-S1. Thus, due to the connection 10, the input current I-T-P flows to the output through the output filter.

Figure 3:
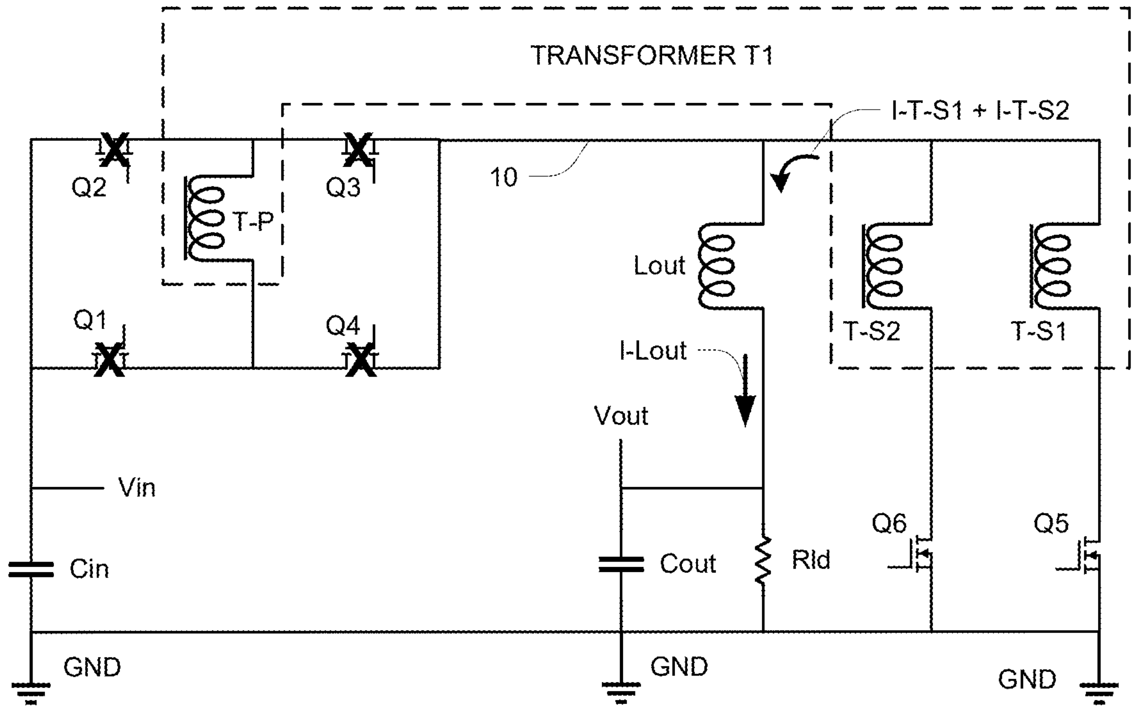
FIG. 3 is a schematic diagram of the non-isolated full bridge converter showing switch states and current conduction in an OFF interval of operation.

FIG. 3 shows operation during an OFF interval t1-t2. All primary-side switches Q1, Q2, Q3, Q4 are turned off, and both secondary-side switches Q5, Q6 are turned on. The volage drop on T-P, T-S1, T-S2 are all zero. The output current I-Lout is the sum of the two secondary winding currents, I-T-S1+I-T-S2.

Figure 4:
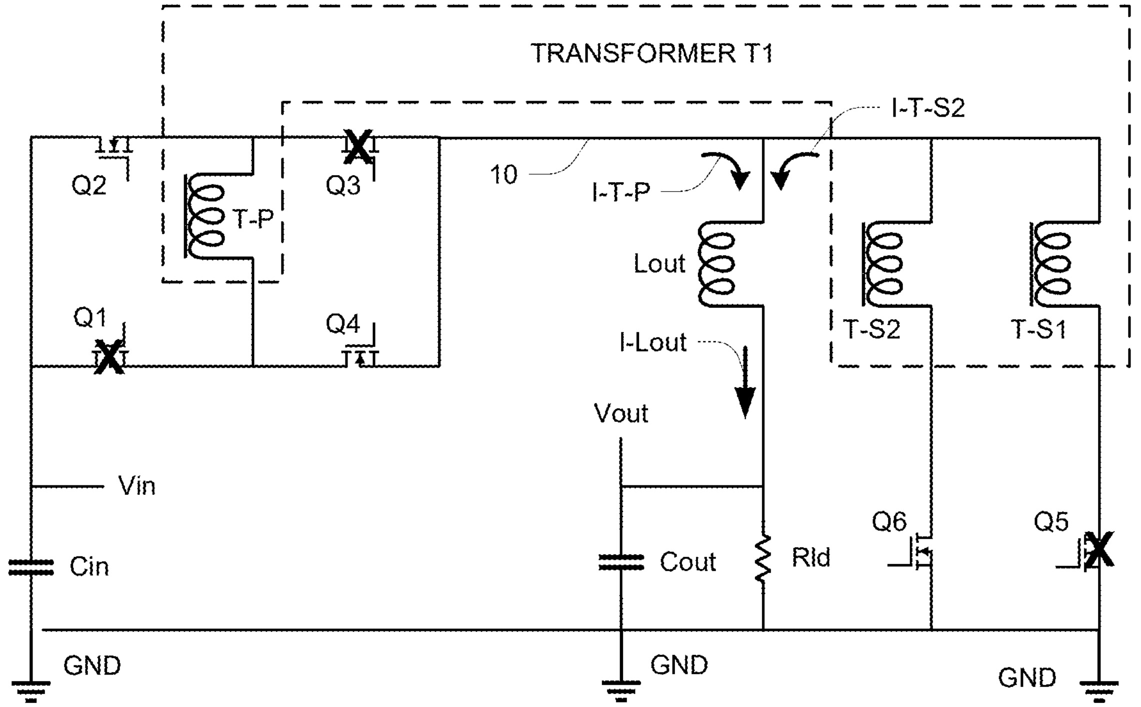
FIG. 4 is a schematic diagram of the non-isolated full bridge converter showing switch states and current conduction in a second ON interval of operation.
Figure 5:
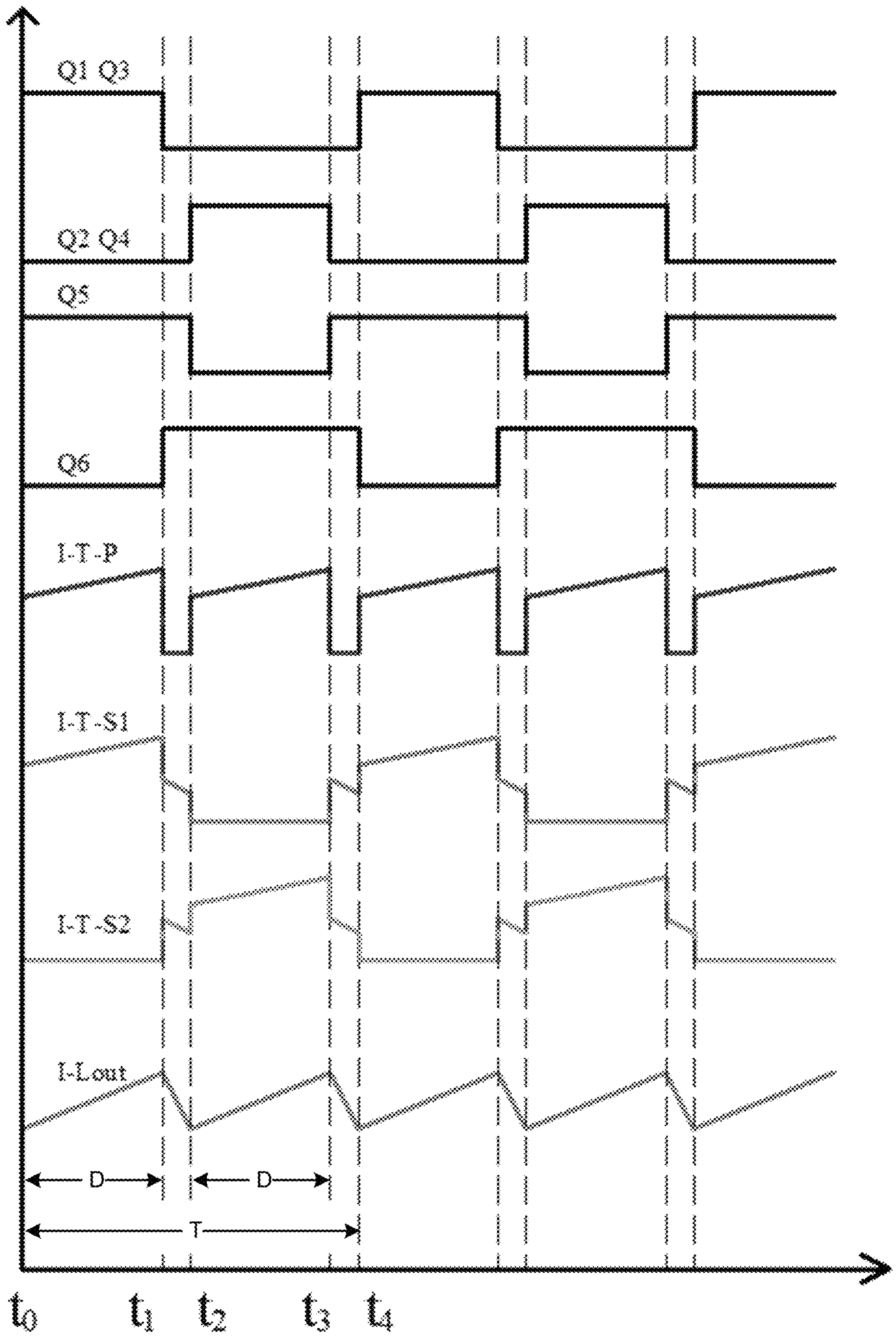
FIG. 5 is a waveform diagram depicting switch states and current conduction of the non-isolated full bridge converter throughout a full switching cycle of operation.

FIG. 4 shows operation in the second ON interval t2-t3. The switches Q1, Q3, and Q5 are turned off, and switches Q2, Q4, and Q6 are turned on. The voltage of Vin drops in the windings T-P and T-S2. The voltage drop on T-P is Vin*Np/(Np+Ns), and voltage drop on T-S2 is Vin*Ns/(Np+Ns). The primary-side current I-T-P is Ns*I-T-S2/Np, and the output current I-Lout is equal to the sum I-T-P+I-T-S2. Thus, due to the connection 10, the input current I-T-P flows to the output through the output filter.

The interval t3-t4 is a second OFF interval which is the same as the OFF interval t1-t2 illustrated in FIG. 3. All primary-side switches Q1, Q2, Q3, Q4 are turned off, and both secondary-side switches Q5, Q6 are turned on. The volage drop on T-P, T-S1, T-S2 are all zero. The output current I-Lout is the sum of the two secondary winding currents, I-T-S1+I-T-S2.

Using conventional notation to describe the cycle interval (t0 to t4) as T and the ON-interval duration (each of t0-t1 and t2-t3) as D, then the converter output voltage Vout is given by:

$$Vout = Vin * 2D * Ns/(\mathrm{Np} + Ns)T$$

One important aspect is that, compared to a conventional isolated converter providing the same output voltage, the non-isolated converter requires fewer primary-side winding turns Np. For example, based on a given duty cycle D, if a conventional isolated design has a turns ratio Np/Ns=4, the equivalent non-isolated design can use a reduced turns ratio Np/Ns=3, i.e., a reduced number of primary winding turns. The reduced turns of the primary winding can enable the use of fewer printed circuit board (PCB) layers and less copper loss for windings which can result in lower cost and higher efficiency.

Additionally, in a conventional isolated converter, the output-side rectifier circuit needs to deliver all the output current which is carried through the secondary windings and rectifier switch components, with power loss being proportional to the square of root-mean-square (RMS) current. In the proposed non-isolated converter circuit, because the input current flows into the output, then the current flowing in the rectifier circuitry is the difference between the output current and the input current. For a given output current, the non-isolated design has less current in the rectifier circuit and less power loss accordingly, providing higher efficiency.

Figure 6:
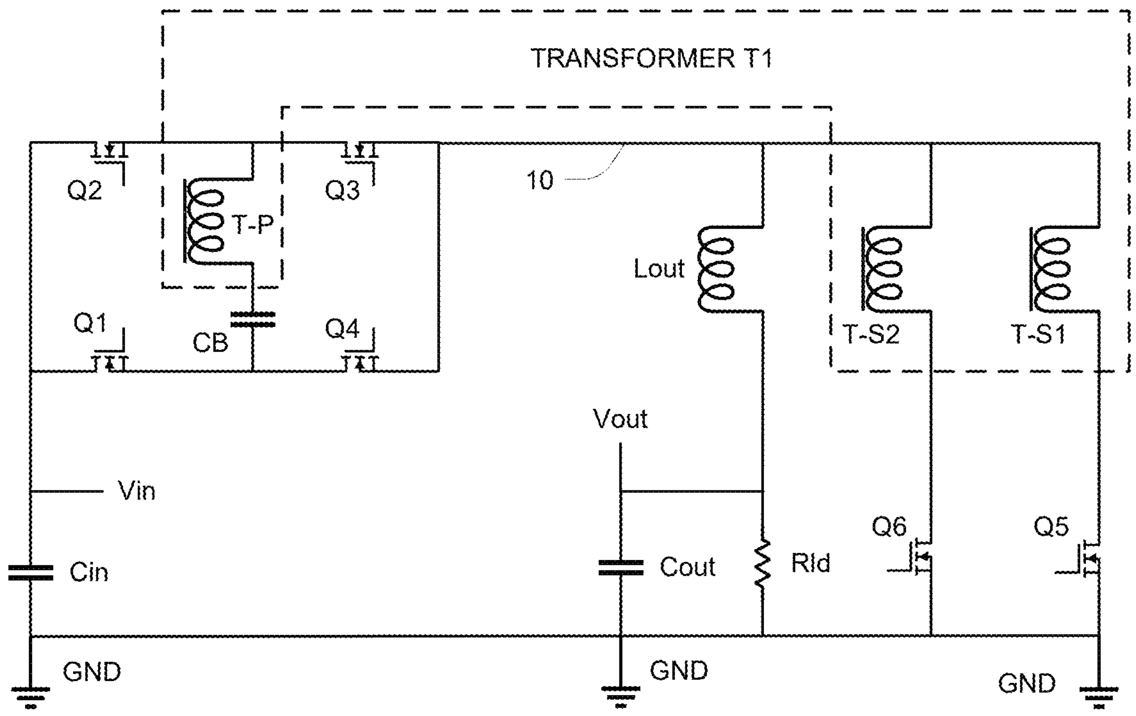
FIG. 6 is a schematic diagram of a second non-isolated full bridge converter employing a primary side blocking capacitor.

FIG. 6 illustrates a converter circuit like that of FIGS. 1-4 while also including a primary-side capacitor CB used to prevent potential saturation of the core of T1 in case there is unbalance duty cycle for the two ON-intervals.

While various embodiments of the invention have been particularly shown and described, it will be understood by those skilled in the art that various changes in form and details may be made therein without departing from the scope of the invention as defined by the appended claims.

What is claimed is:

1. A converter, comprising:

a transformer having a primary winding, a first secondary winding, and second secondary winding, the first and second secondary windings being electrically connected at a secondary center tap;

a primary-side inverter for switched conduction of primary current from a converter input through the primary winding;

a secondary-side rectifier for switched conduction of secondary current through the first and second secondary windings to a converter output; and an output filter connected to the secondary center tap for filtering converter output current to reduce a switching-related AC component thereof, wherein the primary-side inverter is a full-bridge inverter having a low-side common connection and providing two conduction paths for the primary current during respective ON intervals of a switching cycle, the conduction paths connected together at the low-side common connection directly connected to the secondary center tap of the secondary windings to provide the converter output current as the sum of the primary current and the secondary current during the ON intervals of the switching cycle.

2. The converter of claim 1, wherein wherein the secondary-side rectifier includes respective rectifier switches for the first and second secondary windings, the rectifier switches being switched on in respective ones of the ON intervals to conduct respective secondary-winding currents to the converter output.

3. The converter of claim 1, wherein the output filter includes:

an output inductor in series between the secondary center tap of the secondary winding and the converter output; and an output capacitor in parallel with the converter output.

4. The converter of claim 1, wherein the primary-side inverter includes two pairs of transistors, each pair establishing a respective one of the conduction paths, each pair having a first transistor coupled between the converter input and a respective first terminal of the primary winding and a second transistor coupled between a respective second terminal of the primary winding and the low-side common connection.

* * * * *